(12) United States Patent
Lu

(10) Patent No.: US 9,892,649 B2
(45) Date of Patent: Feb. 13, 2018

(54) AUDIO NOISE REDUCTION CIRCUIT, AN INTELLIGENT TERMINAL USING THIS AUDIO NOISE REDUCTION CIRCUIT AS WELL AS A TEACHING METHOD

(71) Applicant: SHENZHEN EAGLESOUL TECHNOLOGY CO., LTD., Shenzhen, Guangdong (CN)

(72) Inventor: Qiwei Lu, Guangdong (CN)

(73) Assignee: SHENZHEN EAGLESOUL TECHNOLOGY CO., LTD., Shenzhen, Guangdong (CN)

(*) Notice: Subject to any disclaimer, the term of this patent is extended or adjusted under 35 U.S.C. 154(b) by 255 days.

(21) Appl. No.: 14/667,337

(22) Filed: Mar. 24, 2015

(65) Prior Publication Data
US 2016/0111009 A1 Apr. 21, 2016

(30) Foreign Application Priority Data
Oct. 17, 2014 (CN) .......................... 2014 1 0553620

(51) Int. Cl.
| | |
|---|---|
| H04B 15/00 | (2006.01) |
| G09B 5/06 | (2006.01) |
| G10K 11/16 | (2006.01) |
| G10L 21/0316 | (2013.01) |
| H04R 3/00 | (2006.01) |
| G10L 21/0208 | (2013.01) |
| G10L 21/0272 | (2013.01) |

(52) U.S. Cl.
CPC ............. *G09B 5/065* (2013.01); *G10K 11/16* (2013.01); *G10L 21/0208* (2013.01); *G10L 21/0316* (2013.01); *H04R 3/005* (2013.01); *G10L 21/0272* (2013.01)

(58) Field of Classification Search
CPC ............. G10L 21/0208; G10L 21/0272; G10L 21/0316; H04R 3/005; G10K 11/16; G09B 5/065
USPC ........................................................ 381/94.1
See application file for complete search history.

(56) References Cited

U.S. PATENT DOCUMENTS

| | | | | |
|---|---|---|---|---|
| 5,953,640 A | * | 9/1999 | Meador ................. | H04B 1/403 455/260 |
| 2010/0245585 A1 | * | 9/2010 | Fisher ................... | G06F 1/1686 348/164 |

\* cited by examiner

*Primary Examiner* — Paul S Kim
(74) *Attorney, Agent, or Firm* — Patent Masters LLC

(57) ABSTRACT

The invention provides an audio noise reduction circuit, an intelligent terminal and a teaching method using this audio noise reduction circuit, where a dual microphone array is used for abatement of noise, ICA algorithm is used for blind source analysis; the audio noise reduction circuit is used to realize the extraction and separation of voice and improve the voice quality in noisy environment, so that the user can also obtain clear voice communication or recording effect even in noise environment; through real-time acquisition and recording of the audio information of teacher, the invention realizes the real-time recording of teaching voice data and solves the following problem: when the learning content is preset in the intelligent terminal, the learning experience is relatively monotonous, leading to unsatisfactory results of learning. Additionally, the invention also realizes the wireless sharing of high quality teachers and the real-time synchronous feedback in the process of teaching and learning, featuring such advantages as high interaction and good results of learning.

16 Claims, 16 Drawing Sheets

US 9,892,649 B2

AUDIO NOISE REDUCTION CIRCUIT, AN INTELLIGENT TERMINAL USING THIS AUDIO NOISE REDUCTION CIRCUIT AS WELL AS A TEACHING METHOD

CROSS-REFERENCE TO RELATED APPLICATION

This application claims priority from Chinese Patent 201410553620.8, filed on Oct. 17, 2014, in the State Intellectual Property Office of the P.R.C, the content of which are hereby incorporated by reference in their entirety for all purposes.

FIELD OF THE INVENTION

The present invention relates to education & training method and equipment, and in particular relates to a network-based interactive teaching method, an intelligent terminal equipment as well as an audio noise reduction circuit used in the intelligent terminal.

BACKGROUND OF THE PRIOR ART

Along with the rapid development and popularization of multi-media and network communication technologies, the multi-media intelligent terminals have gradually entered the teaching field and greatly enrich the teaching means, so that the teaching and learning are no longer restricted by such conditions as geographical environment, the traditional teaching mode is transformed and web-based teaching mode is achieved.

The meaning of web-based teaching: on the basis of intelligent terminal, using the functional characteristics and resources of Internet, establishing network-based learning environment to prompt and support the learning activities of students. Through the combination of network technology with classroom teaching, it is feasible to achieve teaching across progress, time and space and personalized learning.

The fundamental principle of the present web-based teaching mode is described as follows: the pre-recorded audio information of teacher is saved in the intelligent terminal, and this information is correspondingly uploaded to the network-based teaching platform system, and the learner will correspondingly read such information for study. This network-based teaching mode has the following deficiencies:

1. The intelligent terminals are terminal devices of great importance in web-based teaching system. At present, the intelligent terminals are mainly of tablet computers. The teaching software products correspondingly installed on the corresponding tablet computers involve major deficiency in acquisition of teacher's audio information. In particular, in the web-based learning environment, the quality of audio information directly determines the teaching effect. However, the present intelligent terminals fail to effectively filter environmental noise and ensure the quality of audio data;

2. In the prior art, the learning content stored in the intelligent terminal is preset, the learning mode is relatively fixed and the learning process is relatively tedious, leading to unsatisfactory results of learning;

3. The teaching mode in the prior art cannot realize the real-time interaction between the teacher and the learner, and the daily courseware prepared by the teacher cannot placed on the tablet computer for study by the leaner.

SUMMARY OF THE INVENTION

It is the technical objective of the present invention to provide an audio noise reduction circuit, so as to solve such problem that the filtering effect is not satisfactory and the quality of audio data cannot be ensured in the acquisition of audio information at present.

In order to solve the above-mentioned problem, the present invention adopts the following technical solution:

An audio noise reduction circuit, characterized in that, comprising an audio input circuit, an audio amplification buffer circuit, an audio noise reduction processing chip, a filter circuit and a power amplification circuit.

Furthermore, this audio noise reduction circuit also comprises:

An audio input circuit, comprising a microphone MIC1, a microphone MIC_CON1 and an input switching circuit, wherein the input switching circuit comprises an input microphone change-over switch chip U545; the microphone MIC1 is connected with JACK_MIC_0_NO pin of the microphone change-over switch chip U545, the microphone MIC_CON1 is connected with JACK_MIC_0_NC pin of the microphone change-over switch chip U545; both the microphone MIC1 and the microphone MIC_CON1 are used to input the acquired audio signals including noise to the input switching circuit and output such audio signals from COM pin after switching processing through the microphone change-over switch chip U545; after being switched, the audio signals output from COM pin are output to the output end MIC_0 after passing through a filter inductor L530;

An audio amplification buffer circuit, comprising a circuit designed to respectively perform amplification and buffer for the audio signals input by the microphone MIC1 and the microphone MIC_CON1, wherein the circuit designed to perform amplification and buffer for the audio signals input by the MIC1 comprises capacitors C888, C889, C890, C891, C892 and C893 as well as an operation amplifier U544A and resistors R831, R832, R833, R834, R835 and R836; after the switched audio signals output from COM pin of the microphone change-over switch chip U545 have passed through a filter inductor L530 and a blocking capacitor C888, the switched audio signals are output from the output end MIC_0 to 3# pin of the operation amplifier U544A; after having been amplified and buffered by the operation amplifier U544A, these audio signals are output from 1# pin of the operation amplifier U544A; after passing through DC blocking capacitor C889, these audio signals reach the output end XMIC_0; the circuit designed to perform amplification and buffer for the audio signals input by the microphone MIC_CON1 comprise capacitors C895, C896, C897, C898 and C899, an operation amplifier U544B and resistors R838, R839, R840, R841, R842 and R843; the input end MIC_1 is connected with JACK_MIC_0_NC pin of the microphone change-over switch chip U545 through a test point TP24; after passing through the DC blocking capacitor C895, the input end MIC_1 is input to 5# pin of the operation amplifier U544B; after being amplified and buffered by the operation amplifier U544B, these audio signals are output by the 7# pin of the operation amplifier U544B; after passing through DC blocking capacitor C896, these signals are output to the output end XMIC_1;

An audio noise reduction processing chip, comprising a clock interface, an USB interface, an audio interface, a dual channel I2S DAC interface, a digital microphone interface and a dual channel I2S ADC interface, wherein the clock interface comprises a 12 MHz crystal input pin XTAL_I, a 12 MHz crystal output pin XTAL_O and a clock input pin D_CLK_IN; the USB interface comprises a USB_DM pin and a USB_DP pin; the audio interface comprises a common mode input signal reference pin XACREFL/XACREFR, a left channel microphone input pin XMICL, a right channel microphone input pin XMICR, a differential input pin D_MIC1_N of analog microphone 1, a differential input pin D_MIC0_N of analog microphone 0, a differential input pin D_MIC1_P of analog microphone 1 and a differential input pin D_MIC0_P of analog microphone 0; the dual channel I2S DAC interface comprises a I2S master clock pin DAC_MCLK, a I2S bit clock pin DAC_BCLK, a I2S serial data pin DAC_DOUT, a I2S left/right clock pin DAC_LRCK and a data input pin DAC_DIN; the dual channel I2S interface comprises a I2S bit clock D_I2S_BCLK, a I2S data input D_I2S_DI, a I2S left/right clock D_I2S_LRCK and a 2S serial data D_I2S_DO; the digital microphone interface comprises a digital microphone clock input pin D_DMO_CLK, a digital microphone clock out pin D_DMI_CLK, a digital microphone data input pin D_DMI_DAT, a digital microphone data output pin D_DMO_DAT; the dual channel I2S ADC interface comprises an AD conversion data output pin ADC DOUT, a I2S left/right clock pin ADC_LRCK, a I2S serial data input pin ADC DIN, a I2S bit clock pin ADC_BCLK and a I2S master clock pin ADC_MCLK; wherein, after having been amplified and buffered by the audio amplification buffer circuit and having passed through the output end XMIC_0, the audio signals of microphone MIC1 are input to the left channel microphone input pin XMICL; after having been amplified and buffered by the audio amplification and buffer circuit and having passed through the output end XMIC_1, the audio signals of microphone MIC_CON1 are input to the right channel microphone input pin XMICR; the audio noise reduction processing chip is used to abate the noise for the input two-way audio signals through the analog microphone and digital microphone interface array, perform blind source analysis through ICA algorithm to separate the steady-state noise and non-steady state noise, perform voice extraction and separation, and output the extracted and separated voice signals through the left channel line output pin XLNOUTL and right channel line output pin XLNOUTR of the audio noise reduction processing chip;

A filter circuit, comprising input ends LOUT_L_OUT, LOUT_R_OUT, filter inductors L546 and L547, DC blocking capacitors C944 and C945; after noise reduction processing through the audio noise reduction processing chip, the extracted and separated voice signals pass through the left channel line output pin XLNOUTL and are output by the input end LOUT_L_OUT to the filter inductor L546 for filtering processing, then pass through the DC blocking capacitor C944 and then output by the LOUT_L end; after noise reduction processing by the audio noise reduction processing chip, the extracted and separated voice signals pass through the right channel line output pin XLNOUTR and are input by the input end LOUT_R_OUT to the filter inductor L547 for filtering processing, pass through the DC blocking capacitor C945 and then output by the LOUT_R end;

A power amplification circuit, comprising DC blocking capacitors C875 and C876, a power amplification chip U543 and filter inductors L531, L533, L535 and L536; after filtering through the filter circuit, the voice signals output by LOUT_L end passing through the DC blocking capacitor C875 and then are output to the power amplification chip U543; after having been amplified by the power amplification chip U543 as one group, the voice signals respectively pass through the filter inductors L531 and L533 and are output to the speaker;

Furthermore, any way of the voice signals input by the microphone MIC1 and the microphone MIC_CON1 is used as the detection signals of background noise, another way is used as the detection signal of voice, and the microphone MIC1 and the microphone MIC_CON1 are located at different positions with distance of 5-20 CM.

Furthermore, the audio noise reduction processing chip in the audio noise reduction circuit is a CM6571 chip; the microphone change-over switch chip U545 is a SGM3157YC6 chip; both the operation amplifiers U544A and U544B are NJM2746V chips; the power amplification chip U543 is NS4251 chip.

Furthermore, the audio input circuit is connected with CPU through the USB interface USB_DM and USB_DP of the audio noise reduction processing chip CM6571.

The present invention uses dual-microphone array to abate noise and uses ICA algorithm to make blind source analysis, so that the far-field noises received by two microphones basically have the same amplitude; however, for the near-field sound sources, there is major difference in the received amplitude values, and it is feasible to achieve better effect through algorithm separation. The present invention is also designed to eliminate steady-state noise by realizing superposition of power spectrums on the frequency domain and then performing filtering; for the non-steady noise, two microphones provided at different positions to process the received signals and separate out all the undesired steady-state noises and non-steady noises according to their different characteristics such as phase, amplitude, frequency and signal-to-noise ratio, thus realizing noise reduction, sound localization and tracking, voice extraction and separation and in turn improving the voice quality in noisy environment. The present invention uses dual MIC environmental noise elimination technology and can eliminate noise of 30 dB or above; and can also provide echo elimination and single MIC noise reduction function, so that the user can also obtain clear voice talking or recording effect even in a noisy environment.

The present invention also provides an intelligent terminal with built-in audio noise reduction circuit. By read-time acquisition and recording of the audio information of the teacher, the intelligent terminal realizes the real-time recording of teaching audio data, so as to solve the problem that in the use of intelligent terminal preset with learning content, the learning process is relatively tedious, leading to unsatisfactory results of learning.

To solve the above-mentioned problem, following technical solution is adopted:

An intelligent terminal, comprising:

A host internally provided with the said audio noise reduction circuit as well as a high shot instrument connected with the host.

Furthermore, the host comprises a bottom case and a central frame; a main board, a liquid crystal display and a touch panel are fixedly mounted between the bottom case and the middle frame, the main board and the liquid crystal display are electrically connected through a FPC connector; an open slot is provided at the rear end of the base case; a holding slot is provided at the rear end of the central frame, the holding slot is correspondingly located in the open slot, a turnover cover board is also provided in the open slot; after being turned over, the turnover cover board and the holding slot can correspondingly form a sealed cavity;

The high shot instrument is provided in the holding slot, wherein the high shot instrument comprises a main support, an auxiliary support and a photographing rod, wherein one end of the main support is rotatablely connected with a connecting piece fixedly mounted in the holding slot through a rotating shaft piece, another end of the main support is movably connected with one end of the auxiliary support through a first vertical rotating shaft, and the auxiliary support can be opened or closed around the first vertical rotating shaft and in perpendicular to the main support; another end of the auxiliary support is movably connected with the photographing rod through a horizontal rotating shaft and a second vertical rotating shaft, the photographing rod can be opened or closed around the second vertical rotating shaft and in perpendicular to the auxiliary support; when the photographing rod is under open state, it can be turned over around a horizontal rotating shaft in horizontal direction.

Furthermore, a battery, a 3G module, a SIM slot and a main board circuit including the audio noise reduction circuit are provided on the main board, wherein the 3G module and the SIM card are connected with the battery through the main board circuit.

Furthermore, the auxiliary support comprises an upper cover of auxiliary support, a lower cover of the auxiliary support as well as a circuit board installed between the upper cover of auxiliary support and the lower cover of the auxiliary support, wherein the circuit board is electrically connected with the main board through the circuit provided in the main support.

Furthermore, the photographing rod comprises an upper cover of photographing rod, a lower cover of photographing rod as well as a pick-up module and a microphone which are mounted between the upper cover of photographing rod and the lower cover of photographing rod, wherein the photographing rod is electrically connected with the circuit board, and a pick-up head is provided on the pick-up module.

Furthermore, a IC card slot used for inserting IC card and a magnetic card reading head used to read the information on magnetic card/strip are provided on the main board, wherein the both the IC card slot and the magnetic card reading head are connected with the main board circuit.

Furthermore, a jack is also provided at the rear end of the bottom case, and an electromagnetic pen is fixed in this jack.

Furthermore, a rear supporting pad is provided at the rear end bottom of the bottom case, and a front supporting pad is provided at the front end bottom.

The intelligent terminal of the present invention adopts audio noise reduction circuit. Two microphones are used to acquire audio signals, one microphone is mounted on the host, and the other is mounted on the photographing rod. Through these two microphones, the intelligent terminal of the present invention firstly absorbs the surrounding source and input the sound to the audio noise reduction circuit; audio algorithm is adopted to distinguish the sound which is closest to the equipment, for example, at the distance of 60 CM-300 CM, it acquires and distinguishes the wavelength of human voice, so as to judge the audio signals within close distance as the user's voice and generates the effect of reducing noise.

In addition, the present invention also provides a teaching system and method, which combines the intelligent terminal with network to realize the real-time interaction in the process of teaching and learning.

The technical objective of the present invention is achieved through the following technical solution:

A network-based teaching system, comprising:

At least two intelligent terminals disclosed are provided, wherein one set is used as teaching terminal and the other set is used as learning terminal;

A background server, which is used to store the course information recorded and uploaded by the teaching terminal and to perform matching with this course information through ID and time stamp of recorded course;

Wherein the teaching terminal, the learning terminal and the background server are connected through network;

The teaching terminal is used to record the teaching course and correspondingly upload and save the teaching course in the background server in the mode of data stream and audio stream;

Furthermore, the teaching terminal, the learning terminal and the background server are in communication connection through wireless or wired network.

Furthermore, this teaching system also comprises a projection equipment in communication connection with the teaching terminal.

Furthermore, the data stream includes the teaching time and action message recorded by the teaching terminal in the teacher's multi-media classroom; the audio stream includes the classroom time and voice message recorded by the teaching terminal in the teacher's multi-media classroom.

The present invention also provides a network-based teaching method, comprising the following steps:

S1, Recording the teaching course through the teaching terminal, and correspondingly uploading and saving the teaching course in the background server in the mode of data stream and audio stream;

S2, The learning terminal is used correspondingly obtain the ID of recorded course from the background server and correspondingly read the data stream and audio stream corresponding to the time stamp from the background server.

Furthermore, the steps prior to step S1 comprise:

Establishing the communications connections among the teaching terminal, the learning terminal and the background server, wherein the communication connections comprise wired network connection as well as WIFI, 3G or 4G wireless network connection.

Furthermore, when the teaching course is recorded through the teaching terminal, the ID corresponding to this recorded course is also set up at the same time.

Furthermore, the steps after the step S2 also comprise:

The learning terminal feeding back information to the teaching terminal through the background server, and the teaching terminal correspondingly answering the questions in response to this feedback information, wherein the feedback information includes the electronic text document established by the learning terminal or the handwritten paper document scanned through the pick-up head of high shot instrument.

Furthermore, the teaching terminal is designed to initiatively ask questions, request the designated learning terminal to answer such questions and give feedback upon completion of answering; or the teaching terminal is designed to initiatively ask questions, while the learning terminal makes the feedback response; furthermore, after the teaching terminal has made selection, the selected learning terminal answers the questions, and the teaching terminal gives feedback upon completion of answering.

The teaching system and method of the present invention can realize the real-time uploading of daily electronic teaching plans and field courseware, so that the students of other schools or the parents of students can watch these products at anytime and anywhere, and the wireless sharing of high quality teachers is realized. This system is designed to complete uploading and saving of teaching plans and video materials prepared by the teachers through web server, so as to avoid the loss of knowledge due to demission or retirement of teachers; in addition, the network-based teaching mode of the present invention realizes the real-time and synchronous feedback between teachers and students in the process of teaching and learning, featuring such advantages as strong interaction and good results of learning.

DESCRIPTION OF ATTACHED DRAWINGS

Figure 1A:
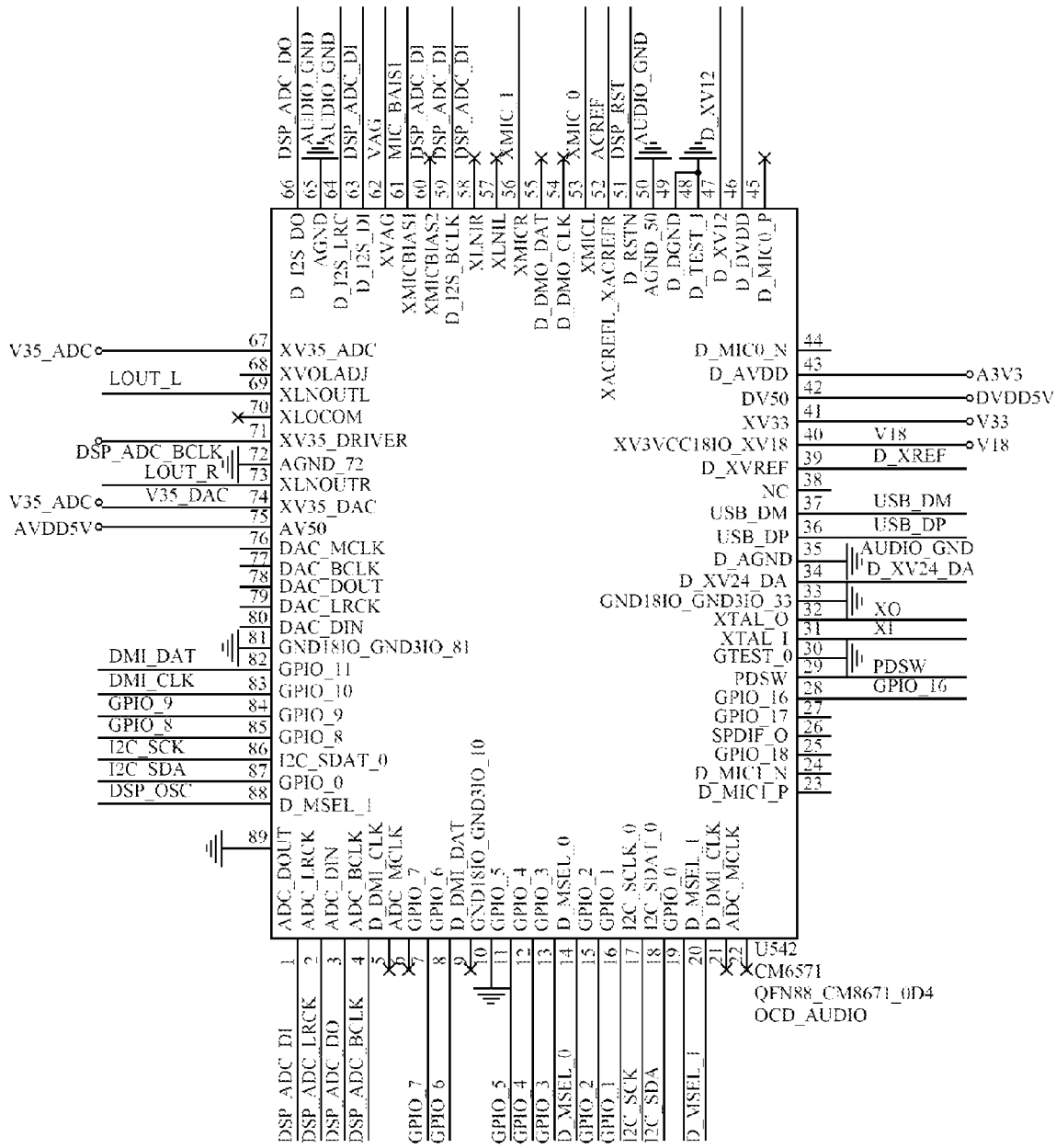
FIGS. 1A and 1B are the schematic circuit diagrams of the audio noise reduction processing chip in the present invention.

Description of symbols in the FIG. 1. Host 11. Bottom case 111. Open slot 112. Jack 113. Front supporting pad 114. Supporting pad 115. Card cover 12. Main board 121. Battery 122. FPC connector 123. magnetic card reading head 124. IC card slot 13. liquid crystal display 14. Central frame 15. Touch screen 2. Holding slot 3. Turnover cover plate 4. Main support 41 Rotating shaft piece 42 Connecting piece 5. Auxiliary support 51. Upper cover of auxiliary support 52. Lower cover of auxiliary support 53. Circuit board 54. First vertical rotating shaft 6. Photographing rod 61. Upper cover of photographing rod 62. Lower cover of photographing rod 63. Pick-up module 631. Pick-up head 64. Second vertical rotating shaft 65. Horizontal rotating shaft 7. Electromagnetic pen

DETAILED DESCRIPTION OF PREFERRED EMBODIMENTS

In order that the objective, technical solution and advantages of the present invention are made even clearly understood, further detailed description of the present invention is provided herein in combination with the attached drawings and embodiments. It is understandable that the specific embodiments described herein are just used to interpret rather than limit the present invention.

The present invention provides an audio noise reduction circuit, in order to address such problem in the traditional teaching that it is necessary for the teacher to record audio/video in professional recording studio, the noise in audio recording is high and it is impossible to perform synchronous recording and teaching due to limited teaching conditions in the field.

With referenced to FIGS. 1~5, as an embodiment, the present invention comprises an audio input circuit, an audio amplification buffer circuit, an audio noise reduction processing chip, a filter circuit and a power amplification circuit.

Figure 2A:
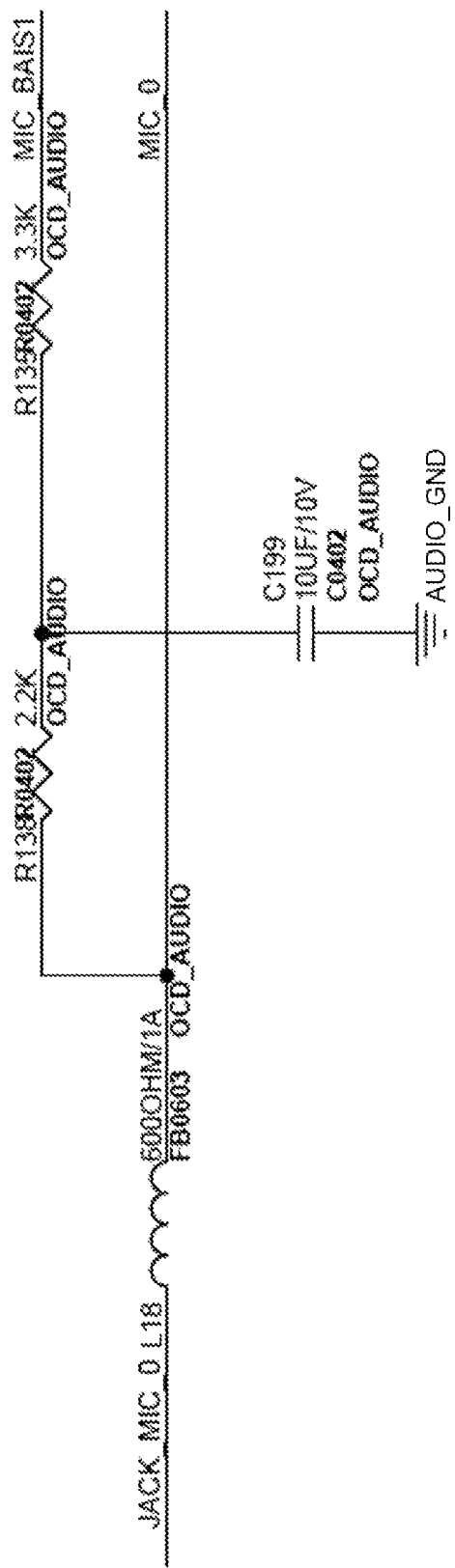
FIGS. 2A, 2B and 2C are the schematic circuit diagrams of the audio input circuit in the present invention.
Figure 2B:
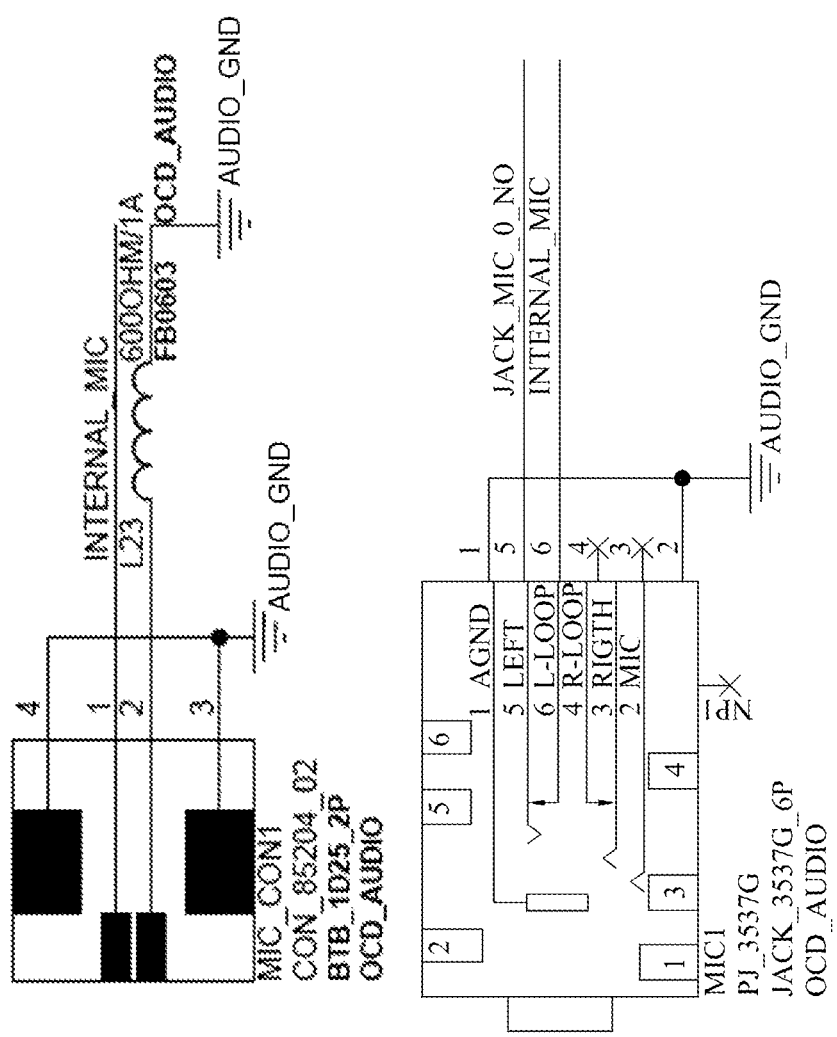
Figure 2C:
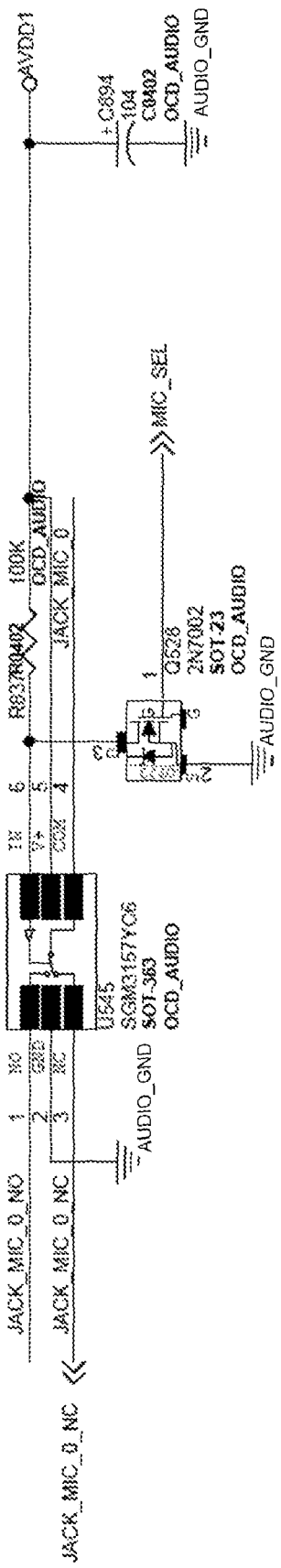

FIG. 2 is the schematic circuit diagram of the audio input circuit in the present invention. The audio input circuit in this embodiment comprises an input switching circuit and two microphones (microphone MIC1 and microphone MIC_CON1). These two microphones are used to acquire the voice signals including noise (respectively divided into two ways), wherein any way can be selected as the detection signals of background noise, while another way can be used as the detection signals of voice; in addition, two microphones (microphone MIC1 and microphone MIC_CON1) are arranged on different positions, with distance between them being 5-20 CM.

The input switching circuit comprises an input microphone change-over switch chip U545, and SGM3157YC6 chip is adopted correspondingly. The microphone MIC1 is connected with 1# pin (JACK_MIC_0_NO) of the microphone change-over switch chip U545, so that audio signals can be input through the microphone MIC1; the microphone MIC_CON1 is connected with 3# pin (JACK_MIC_0_NC) of the microphone change-over switch chip U545, so that audio signals can be input through the microphone MIC_CON1; 3# pin (COM) of the microphone change-over switch chip U545 is used as the output pin, it is corresponding to JACK_MIC_0; after 3# pin (COM) of the microphone change-over switch chip U545 is connected to the filter inductor L530, it is divided into two-way outputs; one way corresponds to the output end MIC_0; the other way corresponds to the output end MIC_BAISI through the resistors R823 and R822; the part between the resistors R823 and R822 is also grounded through the capacitor C877.

The microphone MIC1 and the microphone MIC_CON1 input the acquired audio signals including noise to the input switching circuit; after switching processing through the microphone change-over switch chip U545, the audio signals are output from COM pin; after being switched, the audio signals output from COM pin pass through the filter inductor L530 and reach the output end MIC_0, and are correspondingly input to the audio frequency buffer circuit.

Figure 3A:
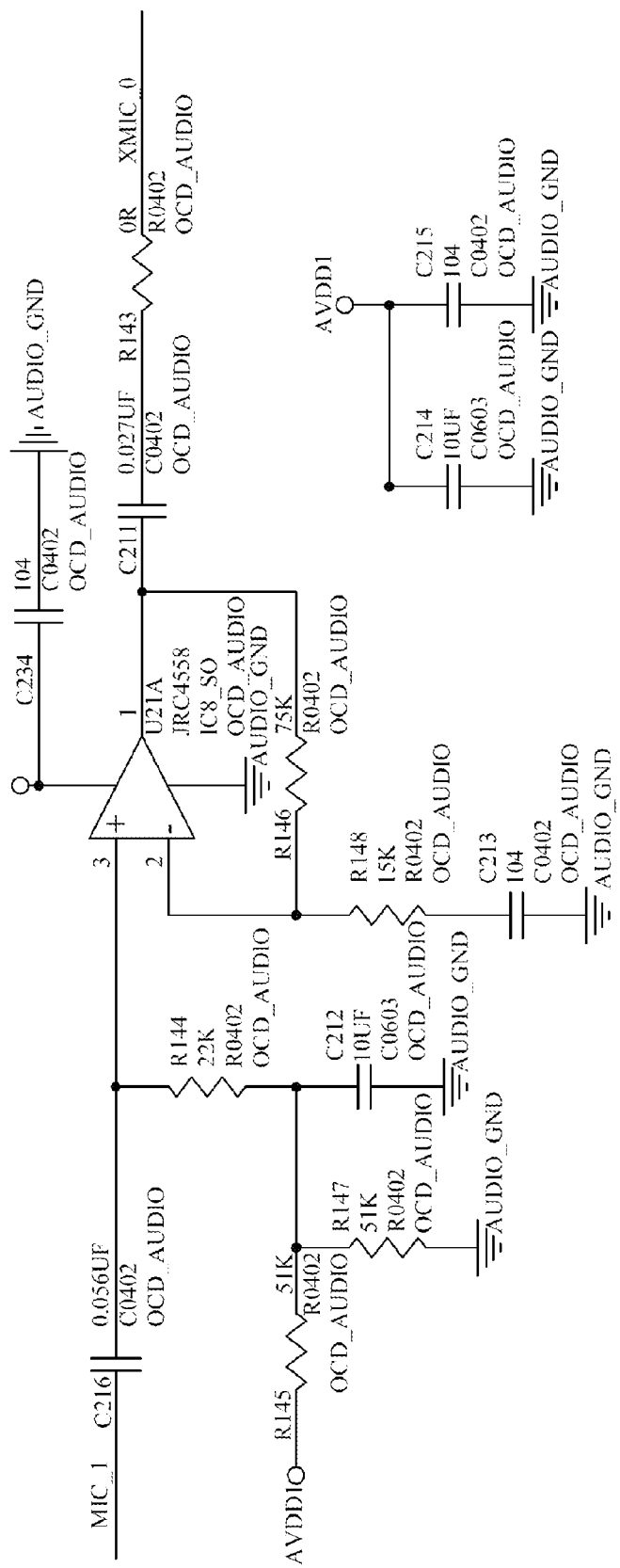
FIGS. 3A and 3B are the schematic circuit diagrams of the audio amplification buffer circuit in the present invention.
Figure 3B:
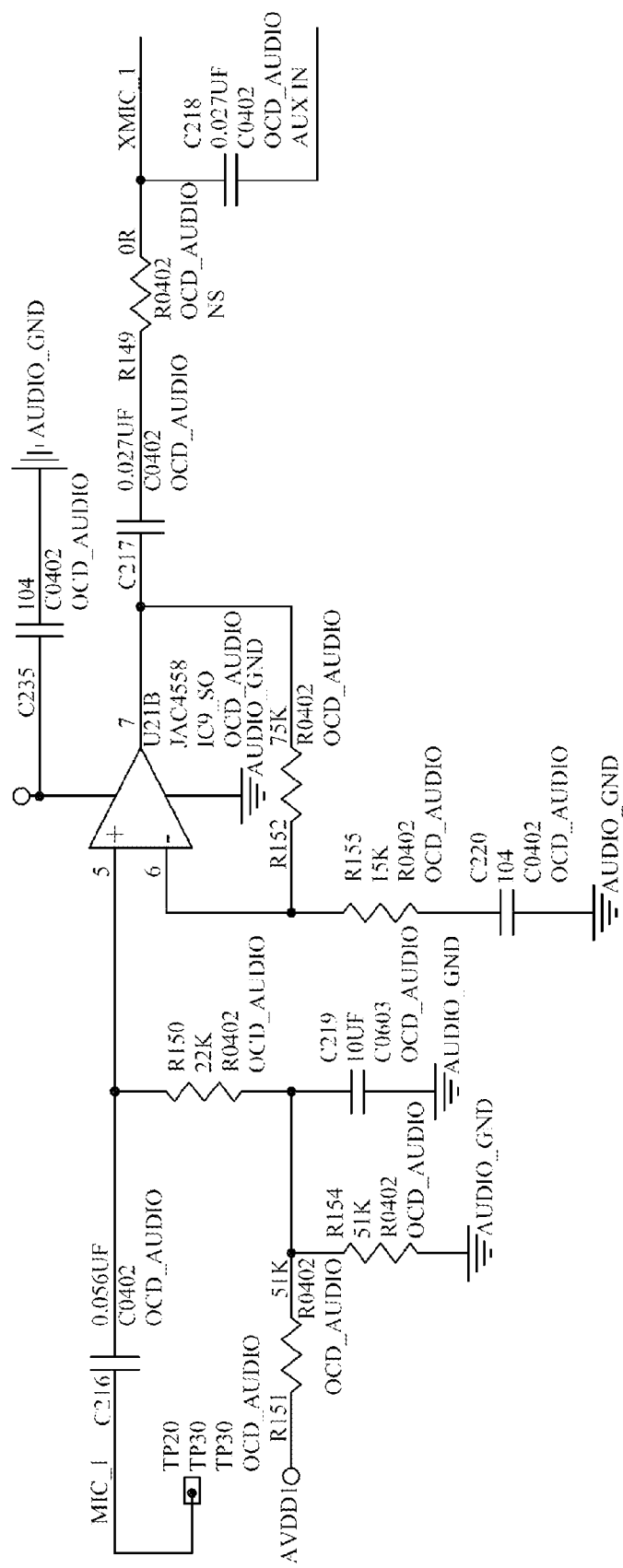

FIGS. 3A and 3B are the schematic circuit diagrams of the audio amplification buffer circuit in the present invention. The audio amplification buffer circuit comprises two parts, wherein the first part is designed to perform amplification and buffer processing for the audio signals input by the microphone MIC1, and the second part is designed to perform amplification and buffer processing for the audio signals input by the microphone MIC_CON1.

Wherein the first part of circuit comprises capacitors C888, C889, C890, C891, C892 and C893, an operation amplifier U544A as well as resistors R831, R832, R833, R834, R835 and R836; the operation amplifier U544A is composed of a NJM2746V chip; the capacitor C888 is a DC blocking capacitor; 3# pin of U544A is connected with the capacitor C888; a resistor R832 is also connected between the capacitor C888 and 3# pin of U544A; the other end of the resistor R832 is divided into two ways, one way is grounded through the capacitor C890, and the other way is grounded through the resistor R833; 2# pin of U544A is divided into two ways, one way is connected with 1# pin of U544A through the resistor R834, and the other way is grounded through the resistors R836 and C891; 1# pin of U544A is connected to the output end XMIC_0 through the capacitor C889 and the resistor R831.

After the switched audio signals output by COM pin of the microphone change-over switch chip U545 have passed through the filter inductor L530 and then through the DC blocking capacitor C888, these audio signals are input from the output end MIC_0 to 3# pin of the operation amplifier U544A; after being amplified and buffered by the operation amplifier U544A, these audio signals are output by 1# pin of the operation amplifier U544A; after passing through the DC blocking capacitor C889, these signals reach the output end XMIC_0.

The second part of circuit comprises capacitors C895, C896, C897, C898 and C899, an operation amplifier U544B as well as resistors R838 R839, R840, R841, R842 and R843; the operation amplifier U544B is composed of a NJM2746V chip; the capacitor C895 is a DC blocking capacitor; 5# pin of U544B is connected with the capacitor C895; a resistor R839 is connected between the capacitor C895 and 5# pin of U544B; the other end of the resistor R839 is divided into two ways, wherein one way is grounded through the capacitor C898, the other way is connected with power supply through the resistor R840; 6# pin of U544B is divided into two ways, one way is connected with 7# pin of U544B through the resistor R841, the other way is grounded through the resistors R843 and C899; 7 # pin of U544B is connected with the output end XMIC_1 through the capacitor C896 and the resistor R838.

The input end MIC_1 of the second part of circuit is connected to JACK_MIC_0_NC pin of the microphone change-over switch chip U545 through the test point TP24, while the input end MIC_1 is input to 5# pin of the operation amplifier U544B through the DC blocking capacitor C895; After being amplified and buffered by the operation amplifier U544B, the input end MIC_1 is output by 7# pin of the operation amplifier U544B; After passing through the DC blocking capacitor C896, the input end MIC_1 reaches the output end XMIC_1 and is input to the audio noise reduction processing chip.

Figure 1B:
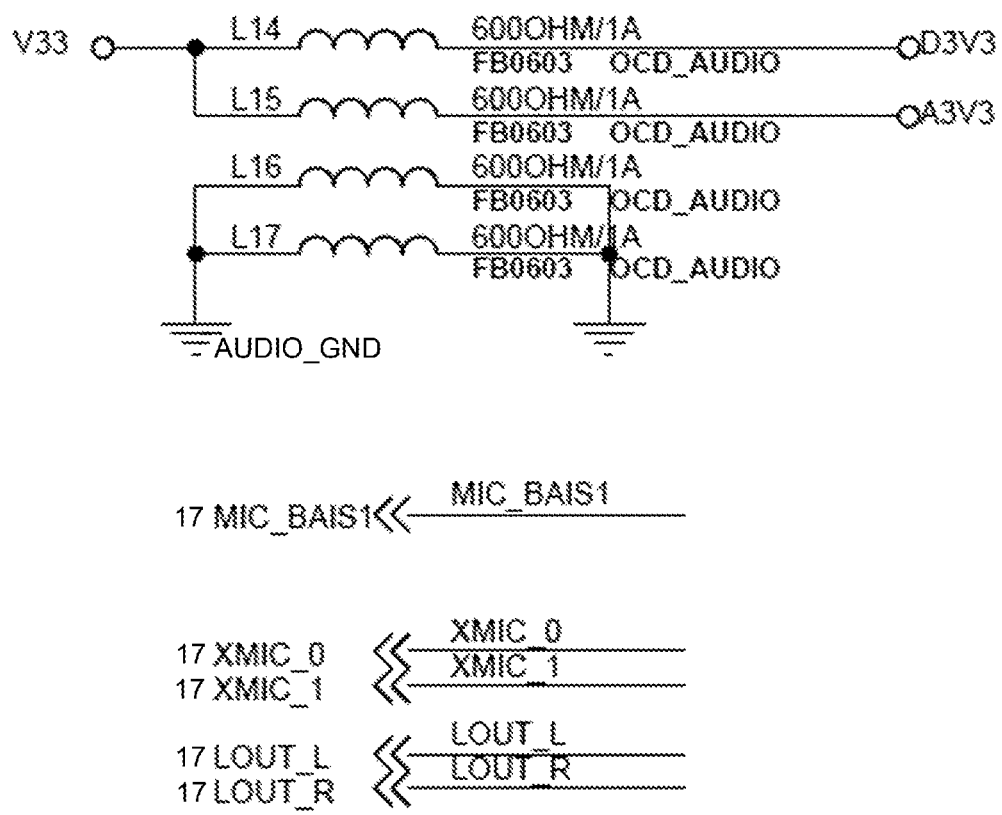

FIGS. 1A and 1B are the schematic circuit diagrams of the audio noise reduction processing chip of the present invention. Both the audio input circuit and the audio amplification buffer circuit are peripheral circuits of the audio noise reduction processing chip, wherein the audio noise reduction processing chip is a CM6571 chip. As a processing core for automatic echo elimination, CM6571 adopts voice processing technology and is used in the communication of voice and music to effectively reduce environmental noise (ENC). In addition, CM6571 chip has such functions as long-distance intelligent voice capture (SVC), voice enhancement (HD VOICE), background noise cancellation (AEC) and long-distance recording (LDR).

Wherein the audio noise reduction processing chip comprises a clock interface, an USB interface, a power grounding interface, an audio interface, a dual channel I2S DAC interface, a dual channel I2S interface, a digital microphone interface, a dual channel I2S ADC interface, a S/PDIF I/O interface, a programmable 10 part, a main serial bus interface and a setting pin part.

The said clock interface comprises a 12 MHz crystal input pin XTAL_I, a 12 MHz crystal output pin XTAL_O and a clock input pin D_CLK_IN. The USB interface comprises a USB_DM pin and a USB_DP pin, both of which are USB2.0 data interfaces. The clock interface can be connected with a CPU. The CPU is correspondingly composed of a CPU chip used for data communication with CM6571. The power ground interface comprises a 5V digital circuit power supply DV50, a 1.8V power supply VCC18IO, a +3.3 v output XV33, a digital ground GND18IO/GND3IO, a 5V analog power supply AV50, an analog ground AGND, a +3.5V supply voltage XV35_DAC, a +3.5V reference voltage XV35_ADC, a +3.5V driving voltage XV35_DRIVER, a filtering capacitor D_XV24_DA, an analog ground D_AGND, an analog power supply D_AVDD, a reference voltage, a capacity ground D_XVREF, a digital power supply D_DVDD, a PLL power supply, a capacity ground D_XV1.2 and a digital ground D_DGND. The audio interfaces include a common mode input signal reference pin XACREFL/XACREFR, a left channel microphone input pin XMICL, a right channel microphone input pin XMICR, an analog microphone 1 differential input pin D_MIC1_N, an analog microphone 0 differential input pin D_MIC0_N, an analog microphone 1 differential input pin D_MIC1_P, an analog microphone 0 differential input pin D_MIC0_P, a left channel line input pin XLINL, a right channel line input pin XLINR, microphone reference voltage 2.75V pins XMICBIAS2 and XMICBIAS1, a reference voltage capacity ground pin XVAG, a control analog voltage output pin XVOLADJ, a left channel line output pin XLNOUTL, a non-capacitive line output pin XLOCOM, a right channel line output pin XLNOUTR, an auxiliary differential input P pin D_AUXIN_P and an auxiliary differential input N pin D_AUXIN_N. The dual channel I2S DAC interfaces include a I2S master clock pin DAC_MCLK, a I2S bit clock pin DAC_BCLK, a I2S serial data pin DAC_DOUT, a I2S left/right clock pin DAC_LRCK and a data input pin DAC_DIN. The dual channel I2S interface comprises a I2S bit clock D_I2S_BCLK, a I2S data input D_I2S_DI, a I2S left/right clock D_I2S_LRCK and a 2S serial data D_I2S_DO. The digital microphone interfaces include a digital microphone clock input pin D_DMO_CLK, a digital microphone clock out pin D_DMI_CLK, a digital microphone data input pin D_DMI_DAT and a digital microphone data output pin D_DMO_DAT. The dual channel I2S ADC interfaces include an analog-digital conversion data output pin ADC_DOUT, an I2S left/right clock pin ADC_LRCK, an I2S serial data input pin ADC_DIN, an I2S bit clock pin ADC_BCLK and an I2S master clock pin ADC_MCLK. The S/PDIF I/O interface includes a S/PDIF transmission pin SPDIF_O; the programmable JO part includes a general-purpose programmable I/O pin GPIO_10-GPIO_18; the main serial bus interfaces include a 2-wire main serial data pin I2C_SDAT_0, a 2-wire serial clock pin I2C_SCLK_0, an I2C clock pin D_I2C_CLK_1 and an I2C data pin D_I2C_DAT_1; the setting pins include an off-state pin PDSW, a test pin TEST_0, a test pin D_TEST_1, a operating mode selection pin D_MSEL_0 and a resetting pin D_RSTN.

After being amplified and buffered by the audio amplification buffer circuit, the voice signals of microphone MIC1 pass through the output end XMIC_0 and then are input to the left channel microphone input pin XMICL; After being amplified and buffered by the audio amplification buffer circuit, the voice signals of microphone MIC_CON1 pass through the output end XMIC_1 and then are input to the right-channel microphone input in XMICR; through the analog microphone and the digital microphone interface array, the audio noise reduction processing chip eliminates the noise for the input two-way voice signals, performs blind source analysis through ICA algorithm, separates out steady-state noise and non-steady noise, performs voice extraction and separation, and outputs the extracted and separated voice signals to the filter circuit through the left channel line output pin XLNOUTL and right channel line output pin XLNOUTR of the audio noise reduction processing chip.

The audio noise reduction processing chip CM6571 used in the present invention uses dual-microphone array to abate noise and uses ICA algorithm to make blind source analysis, so that the far-field noises received by two microphones (including microphone MIC1 and microphone MIC_CON1) basically have the same amplitude; however, for the near-field sound sources, there is major difference in the received amplitude values, and it is feasible to achieve better effect through algorithm separation. In addition, the noises are divided into steady-state noise and non-steady noise. The present invention is also designed to eliminate steady-state noise by realizing superposition of power spectrums on the frequency domain and then performing filtering; For the non-steady noise, two microphones provided at different positions to process the received signals and separate out all the undesired steady-state noises and non-steady noises according to their different characteristics such as phase, amplitude, frequency and signal-to-noise ratio, thus realizing noise reduction, sound localization and tracking, voice extraction and separation and in turn improving the voice quality in noisy environment.

Figure 4:
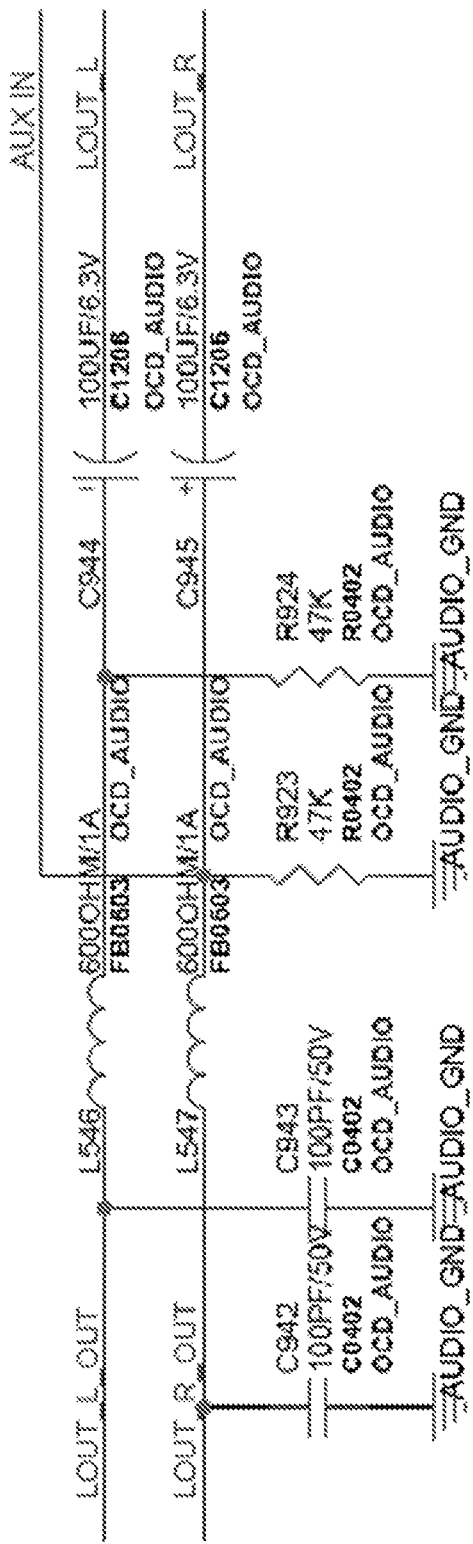
FIG. 4 is the schematic circuit diagram of the filter circuit in the present invention.

FIG. 4 is the schematic circuit diagram of the filter circuit in the present invention. As shown in FIG. 4, the filter circuit comprises input ends LOUT_L_OUT and LOUT_R_OUT, filter inductors L546 and L547, DC blocking capacitors C942, C943, C944 and C945 as well as resistors R923 and R924. A DC blocking capacitor C943 is connected between the input end LOUT_L_OUT and the filter inductor L546, and the DC blocking capacitor C943 is grounded; the filter inductor L546 is connected with C944, a resistor R924 is connected between the filter inductor L546 and the DC blocking capacitor C944, and they are grounded through the resistor R924; A DC blocking capacitor C942 is connected between the input end LOUT_R_OUT and the filter inductor L547, and this DC blocking capacitor C942 is grounded; the filter inductor L547 is connected with C945, a resistor R923 is connected between the filter inductor L547 and C945, and both are grounded through the resistor R923.

Figure 5:
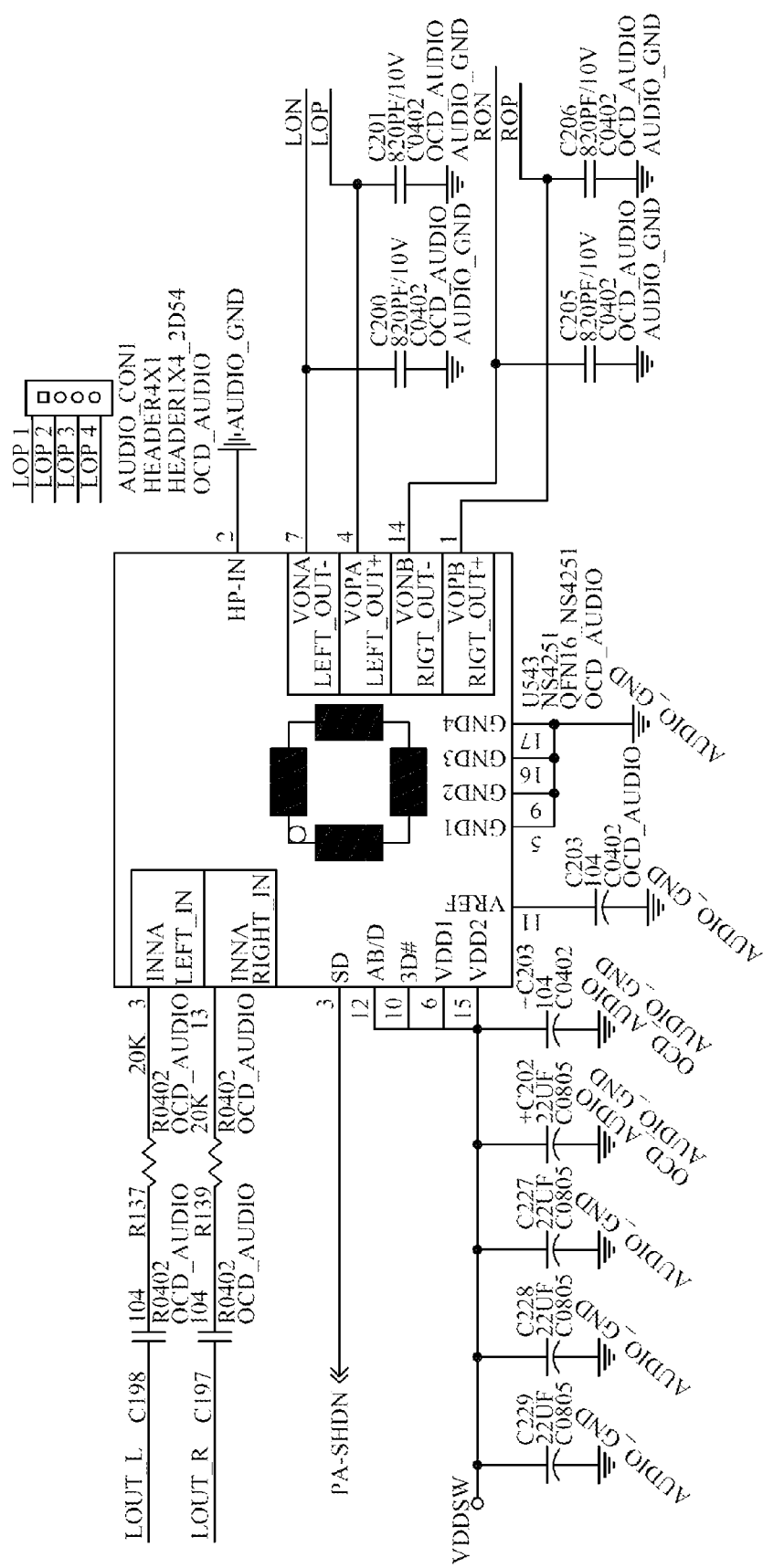
FIG. 5 is the schematic circuit diagram of the power amplification circuit in the present invention.

After noise reduction processing through the audio noise reduction processing chip, the extracted and separated voice signals pass through the left channel line output pin XLNOUTL and are output by the input end LOUT_L_OUT to the filter inductor L546 for filtering processing, then pass through the DC blocking capacitor C944 and then output by the LOUT_L end; After noise reduction processing by the audio noise reduction processing chip, the extracted and separated voice signals pass through the right channel line output pin XLNOUTR and are input by the input end LOUT_R_OUT to the filter inductor L547 for filtering processing, pass through the DC blocking capacitor C945 and then output by the LOUT_R end;

FIG. 5 is the schematic circuit diagram of the power amplification circuit in the present invention. The power amplification circuit in the present embodiment comprises DC blocking capacitors C875, C876, C879, C880, C881, C882, C883, C884 and C886, a power amplification chip U543, filter inductors L531, L533, L534, L535 and L536, resistors R819, R820, R823 and R826, wherein the power amplification chip U543 is a NS4251 chip. The DC blocking capacitor C875 is connected with 8# pin INNA of the power amplification chip U543. The power supply pins VDD1 and VDD2 of U543 are connected to VDDSW through L534, while VDD1 and VDD2 are also grounded through C881 and C882; VREF pin of U543 is grounded through C883, HP-IN pin is connected with the resistor R823; The DC blocking capacitor C876 is connected with 13# pin of the power amplification chip U543 through the resistor R826.

VONA pin and VOPA pin of the power amplification chip U543 constitute a group of signals output to the speaker, wherein the VONA pin is output to the speaker through the filter inductor L531, a capacitor C879 is connected with the filter inductor L531 and the speaker, and this capacitor C879 is grounded; VOPA pin of U543 is output to the speaker through the filter inductor L533, a capacitor C880 is connected between the filter inductor L533 and the speaker, and this capacitor C880 is grounded. After being filtered by the filter circuit, the voice signals output from LOUT_L end pass through the DC blocking capacitor C875 and then are output to the power amplification chip U543; After being amplified through the power amplification chip U543, a group of voice signals respectively pass through the filter inductors L531 and L533 and then are output to the speaker.

VONB pin and VOPB pin of the power amplification chip U543 constitute another group of signals output to the speaker, wherein VONB pin is output to the speaker through the filter inductor L535, a capacitor C884 is connected between the filter inductor L535 and the speaker, and this capacitor C884 is grounded; VOPB pin of U543 is output to the speaker through the filter inductor L536, a capacitor C886 is connected between the filter inductor L536 and the speaker, and this capacitor C886 is grounded; After being filtered by the filter circuit, the voice signals output from LOUT_R end pass through the DC blocking capacitor C876 and then are output to the power amplification chip U543; After being amplified by the power amplification chip U543 as another group of voice signals, these voice signals respectively pass through the filter inductors L535 and L536 and then output to the speaker.

In general, the normal speech frequency of user is within the range of 2-20 Khz, while the voice signals which exceed or fall below this range can be regarded as environmental noise. Through the use of dual MIC environmental noise elimination technology, this circuit can eliminate noise of 30 dB above; In addition, this circuit can also provide echo elimination and single MIC noise reduction function, so that the user can also obtain clear voice talking or recording effect even in noisy environment.

The description on the audio noise reduction circuit in the present invention is provided. A intelligent terminal using the above-mentioned audio noise reduction circuit will be described in combination with the attached FIGS. 6-9.

The present invention also provides an intelligent terminal, which is mainly used in the field of education and address such problems as much environmental noise in audio information, low audio quality, failure to realize real-time sync feedback in learning, unsatisfactory interactivity and unsound results of learning in the intelligent terminal devices used in teaching at present.

The present invention has made improvements to the prior art and mainly comprises a host 1 and a high shot instrument.

Wherein, the host 1 comprises a bottom case 11 and a central frame 14; a main board 12, a liquid crystal display 13 and a touch screen 15 are fixedly mounted between the bottom case 11 and the central frame 14; a main board circuit is provided on the main board 12; the main board circuit comprises an audio noise reduction circuit and a CPU chip; the CPU is connected with the CM6571 chip in the audio noise reduction circuit through the USB interface. The touch screen 15 is a capacitor electromagnetic composite type two-layer touch screen, wherein the upper layer is a capacitor screen, while the lower layer is an electromagnetic screen.

A battery 121, a 3G module, a SIM card slot, an IC card slot 124 and a magnetic card reading head 123 are also provided on the main board 12, wherein the 3G module, the SIM card slot, the IC card slot 124 and the magnetic card reading head 123 are connected with the main board circuit, the main board circuit is connected with the battery 121 and is powered through the battery 121; the magnetic card reading head 123 is used to read the magnetic card/magnetic strip information; the IC card slot 124 is used to insert IC card and read IC card information. Through the IC card slot and the magnetic card reading head, the present invention can realize the swiping of bankcard and facilitate the field payment to teaching/training organization. In addition, through distribution of membership cards, the present invention can realizes sign-in and member management by swiping card.

A FPC connector 122 is provided on the main board 12, and the main board 12 can be connected the liquid crystal display 13 with this FPC connector 122.

An open slot 111 is provided at the rear end of the base case 11; a holding slot 2 is provided at the rear end of the central frame 14, the holding slot 2 is correspondingly located in the open slot 111, a turnover cover board 3 is also provided in the open slot 111; after being turned over, the turnover cover board 3 and the holding slot 2 can correspondingly form a sealed cavity; A jack 112 is also provided at the rear end of the bottom case 11, an electromagnetic pen 7 can be correspondingly fixed in the jack 112; a control circuit, an electromagnetic pen induction module and a power battery are provided in the electromagnetic pen 7; the control circuit is electrically connected with the electromagnetic pen induction module and the power battery; one end of the electromagnetic pen is an electromagnetic pen-point, and the other end is a laser pen end; a noise reduction microphone is provide in the middle of the electromagnetic pen, the noise reduction microphone is connected with a control circuit; a bluetooth module is provided on the control circuit and is used to transmit sound signals. This electromagnetic pen can not only directly write text on the touch screen but can also be held in hand and serves as microphone and/or laser remote controller.

A card cover 115 used to fix 3G module is also provided at the bottom of the bottom case 11. In addition, in order to achieve preferable viewing angle, a rear supporting pad 114 is also provided at the rear end bottom of the bottom case 11. A front supporting pad 113 is provided at the bottom of the front end, so that the whole host 1 has a certain inclination angle and thus facilitate the user to watch and use.

A high shot instrument provided in the holding slot 2, comprising a main support 4, an auxiliary support 5 and a photographing rod 6, wherein one end of the main support 4 is rotatablely connected with a connecting piece 42 fixedly mounted in the holding slot 2 through a rotating shaft piece 41, and another end of the main support is movably connected with one end of the auxiliary support 5 through a first vertical rotating shaft 54.

The auxiliary support 5 comprises an upper cover 51 of auxiliary support, a lower cover 52 of the auxiliary support as well as a circuit board 53 installed between the upper cover 51 of auxiliary support and the lower cover 52 of the auxiliary support, wherein the circuit board 53 is connected with the main board circuit on the main board 12 through the circuit provided in the main support 4.

The photographing rod 6 comprises an upper cover 61 of photographing rod, a lower cover 62 of photographing rod as well as a pick-up module 63 and a microphone which are mounted between the upper cover 61 of photographing rod and the lower cover 62 of photographing rod, wherein the pick-up module 63 is electrically connected with the circuit board 53, and a pick-up head 631 is provided on the pick-up module 63.

Figure 6:
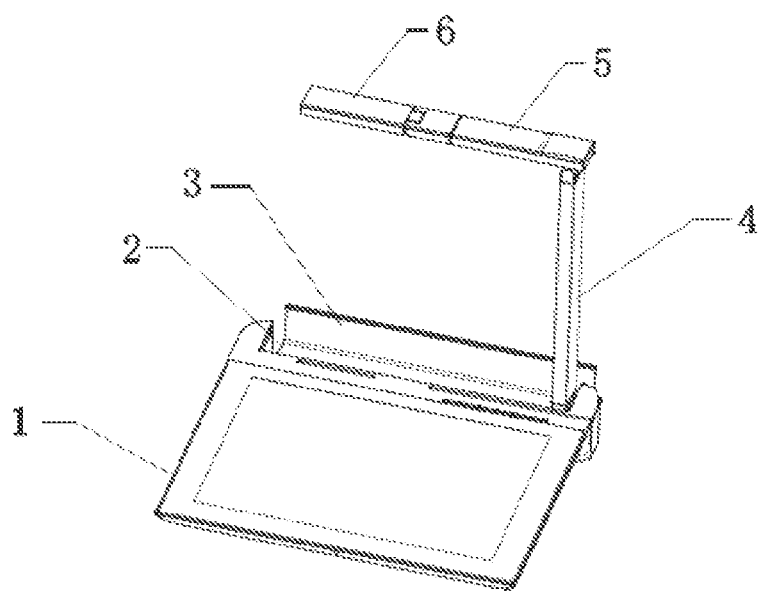
FIG. 6 is the schematic diagram 1 showing the operating state of the intelligent terminal of the present invention.
Figure 7:
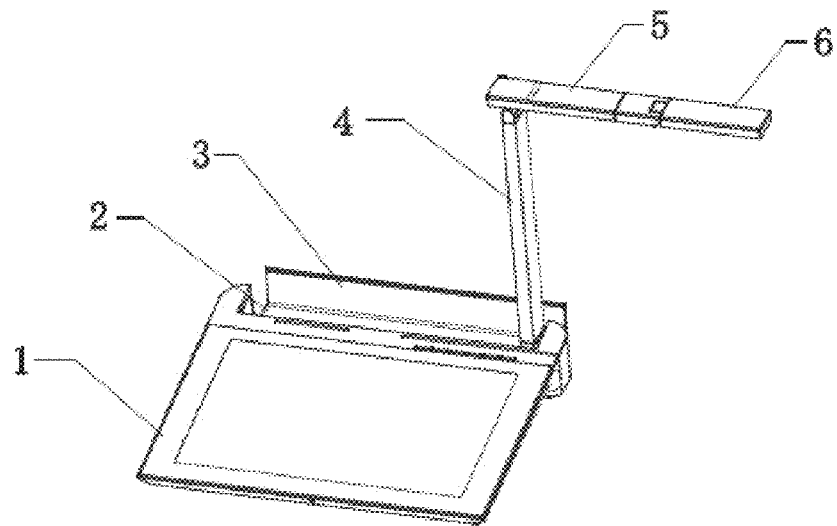
FIG. 7 is the schematic diagram 2 showing the operating state of the intelligent terminal of the present invention.

Since one end of the auxiliary support 5 is movably connected with the main support 4 through a first vertical rotating shaft 54, the auxiliary support 5 can be opened or closed around the first vertical rotating shaft 54 and in perpendicular to the main support 4; when it is opened, the auxiliary support 5 is vertical to the main support 4, and the auxiliary 5 can rotate around the first vertical rotating shaft 54 in a horizontal plane; when it is closed, the auxiliary support 5 is overlapped with the main support 4 (see FIGS. 6 and 7).

The other end of the auxiliary support 5 is movably connected with the photographing rod 6 through a horizontal rotating shaft 65 and a second vertical rotating shaft 64, wherein the photographing rod 6 can be opened or closed around the second vertical rotating shaft 64 and in perpendicular to the auxiliary support 5; when it is opened, the photographing rod 6 can be opened in together with the auxiliary support 5 to a same horizontal position, so that both are in the same horizontal line; when it is closed, the auxiliary rod 5 is correspondingly overlapped with the photographing rod 6 (see FIGS. 6 and 7).

A horizontal rotating shaft 65 is also mounted between the photographing rod 6 and the auxiliary support 5. When the photographing rod 6 is opened relative to the auxiliary support 5, both are on the same horizontal line. At this moment, if the photographing rod 6 is rotated in the vertical direction, the photographing rod 6 can rotate around the horizontal rotating shaft 65; correspondingly the end mounted with pick-up head 631 and microphone on the photographing rod 6 faces towards the user (see FIG. 8).

When the auxiliary support 5, the main support 4 and the photographing rod 6 are in closed state, the auxiliary support 5 and the photographing rod 6 are correspondingly overlapped with the main support 4; In such case, when the main support 4 is rotated, it will rotate around the rotating shaft piece 41 and is correspondingly held in the holding slot 2, and the turnover cover plate 3 is correspondingly rotated to the closed state. At this moment, the intelligent terminal of the present invention is externally viewed as a tablet computer.

Figure 8:
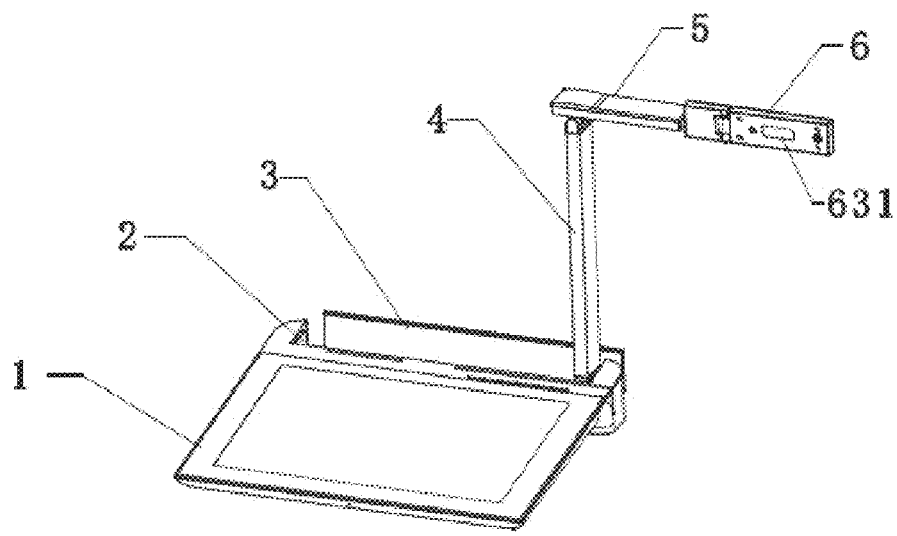
FIG. 8 is the schematic diagram 3 showing the operating state of the intelligent terminal of the present invention.
Figure 9:
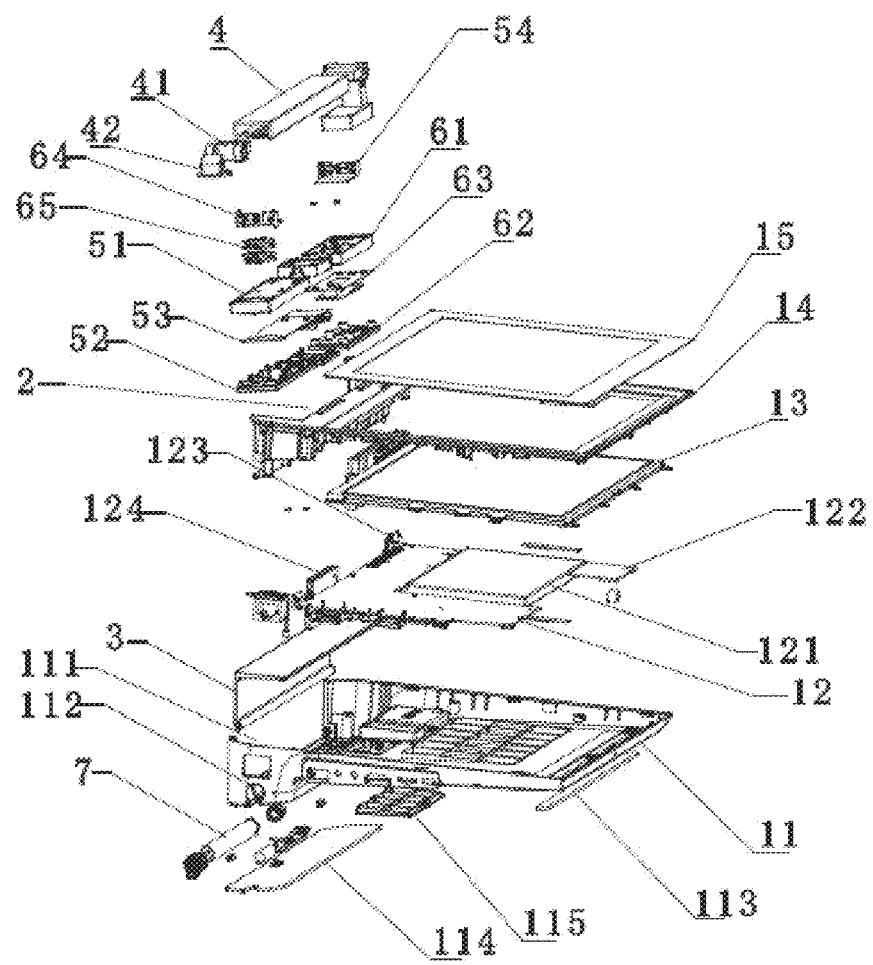
FIG. 9 is the structure diagram of the intelligent terminal in the present invention.

When the turnover cover plate 3 is in opened state, it is feasible to take out the high shot instrument from the holding slot 2 and correspondingly open it to the state in need of operation according to the mode shown in FIGS. 6-8.

In addition, the present invention can perform operation on the whole intelligent terminal through a provided electromagnetic pen 7, so as to realize teaching. The electromagnetic pen can greatly facilitate the teacher and the students to realize on-line interaction, and the whiteboard of teacher can be remotely broadcasted to the students; the adopted high shot instrument can facilitate the teacher to answer questions for the students in real-time mode. The students can directly photograph and upload the unclear questions through the high shot instrument, while the high shot instrument also facilitates the on-line interaction between the teacher and the students.

The intelligent terminal of the present invention adopts audio noise reduction circuit. Two microphones are used to acquire audio signals, one microphone is mounted on the host, and the other is mounted on the photographing rod. Through these two microphones, the intelligent terminal of the present invention firstly absorbs the surrounding source and input the sound to the audio noise reduction circuit; audio algorithm is adopted to distinguish the sound which is closest to the equipment, for example, at the distance of 60 CM-300 CM, it acquires and distinguishes the wavelength of human voice, so as to judge the audio signals within close distance as the user's voice and generates the effect of reducing noise.

For example, based on diameter of 3 m, the present invention can acquire the sound within 3 m and can distinguish the wavelength of human sound and finally process and collect the distinguished sound into equipment, while remove the sound outside 3 m as noise.

Figure 10:
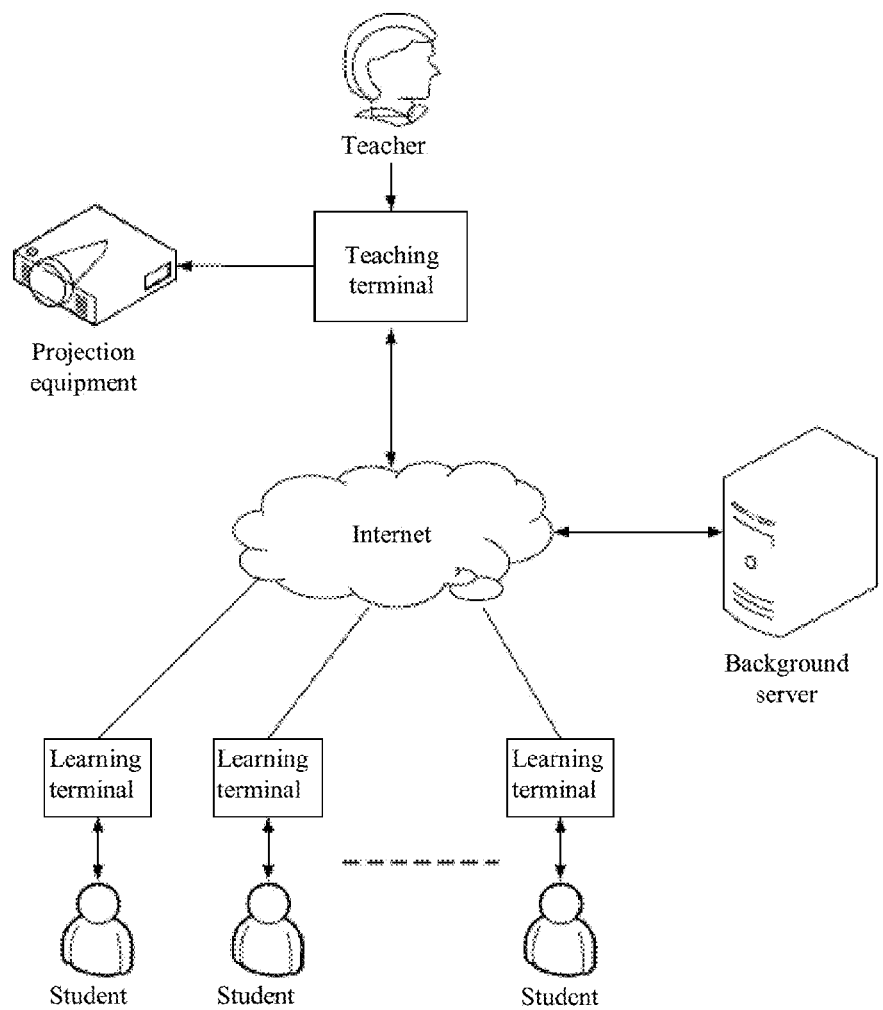
FIG. 10 is the schematic diagram illustrating the network connection of the teaching system in the present invention.
Figure 11:
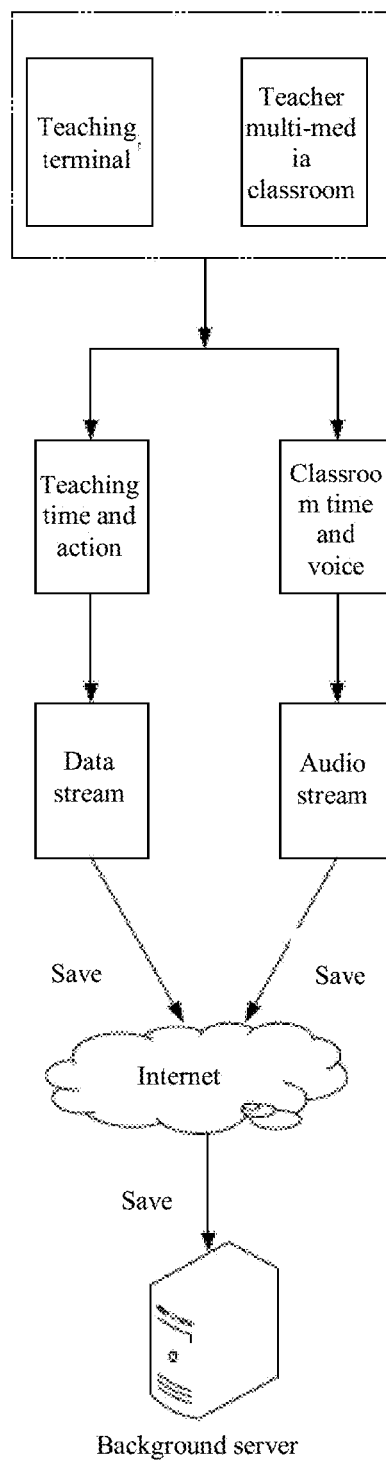
FIG. 11 is the schematic diagram of course recording at the teaching end in the teaching system in the present invention.
Figure 12:
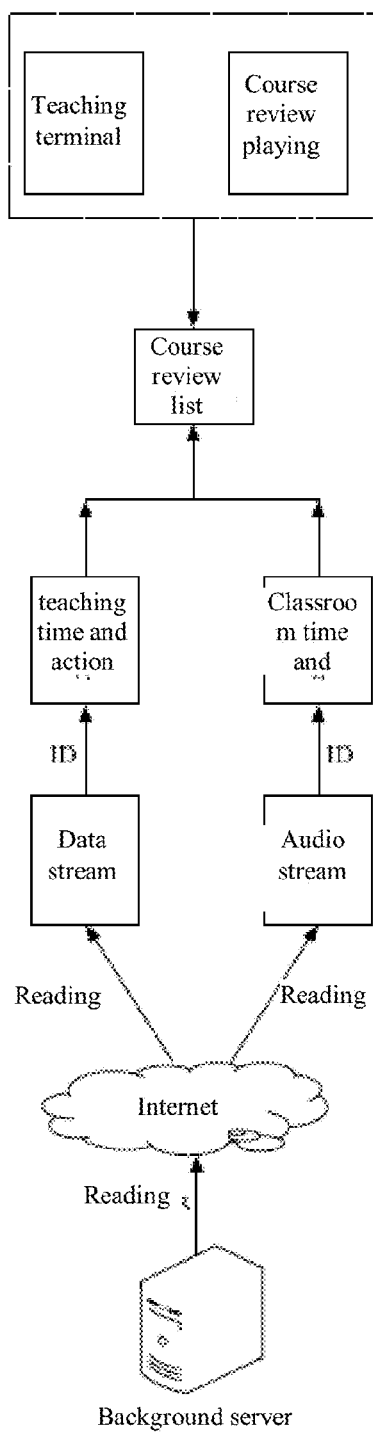
FIG. 12 is the schematic diagram of course review at the learning end in the teaching system in the present invention.

The intelligent terminal provided with audio noise reduction circuit in the present invention is described above. The network-based teaching system using this intelligent terminal is described in combination with the FIGS. 10~12.

This teaching system mainly comprises at least two intelligent terminals, wherein one set is used as the teaching terminal and the other set is used as the learning terminal, the intelligent terminals adopt IMX6 main boards with built-in Android system and system optimization unit; the system optimization unit can perform optimization for the process initiation of Bootloader, Linux kernel, Android Init and Android Server service starting, and it is integrated with an audio unit composed of a sound pickup, an AEC echo elimination module, a audio amplifier, an external speaker or an earphone; an video unit composed of a high shot instrument pick-up head and a video codec unit; an input unit composed of touch screen, electromagnetic pen, LINE-IN interface and USB interface; a display unit composed of a touch screen and a HDMI interface; a storage unit composed of a flash, a memory and a TFT card slot; a swiping card unit composed of magnetic strip read-write, IC read-write, data decoding and encryption processing chip as well as a communication unit composed of RJ45 interface, WIFI module and 3G PCI-E module.

The teaching system of the present invention also comprises a background server, this background server can store the course information recorded and uploaded by the teaching terminal and can perform matching with this course information through the ID and time stamp of the recorded course. System of CentOS6.4 or above is deployed on the background server, Mysql database is used for storage of intelligent terminal interaction data, including audio, video and text file and forms directory and indexes for reading and calling. The background server is also store the event information, logon information and log information generated in system operation, which are used for the uploading and management of courseware in the courseware edition and management system.

The teaching terminal, the learning terminal and the background server are in network connection. Wire communication among them can be realized through RJ45 interface, or wireless network communication among them can be realized through WIFI module, 3G PCI-E module and 4G modules. The teaching terminal is used to record the teacher course and correspondingly uploads and saves the teacher course in the background server in the mode of data stream and audio stream; the learning terminal is used to obtain the ID of recorded course and correspondingly read the data stream and audio stream corresponding to the time stamp from the background server. The data stream comprises the teaching time and action information recorded by the teaching terminal in the teacher multi-media classroom; the audio stream comprises the classroom time and audio information recorded by the teaching terminal in the teacher multi-media classroom.

In addition, this system also comprises projection equipment in communication connection with the teaching terminal. The projection equipment adopts projector and screen or wide-screen display. In the classroom instruction, the teacher may control the terminal to be connected with the projection equipment through HDMI interface, so as to project the content on the touch screen of terminal.

This system also comprises a teacher PC end. Through the PC end, the teacher can log on the background server, download and install the course editor. The source code of this editor is developed in C & C++ mode. Based on Office2010 Word version, the teacher can complete the addition and edition of multiple choice questions, single choice questions and true/false questions, then upload these questions to background server and save the test question courseware and courseware analysis result in XML document in the sever; the intelligence terminal uses the information analyzed by courseware to make division of courseware and generate SWF question document, and display such document on touch screen. For the intelligent judgment on answers, the system can make comparison between the answers provided by the students and the answers pre-stored in the server end, and automatically make result statistics after completion of answering, so as to facilitate classroom exercise or test.

The intelligent terminal of the present invention comprises a 3G PCI-E module, and a SIM card is correspondingly inserted into this module. This system can mutually bind the communication code of learning terminal SIM card used by a student with the mobile numbers of the parents of this student, while the student end uses the names and mobile numbers of parents to register personal file number in server; the parents can log on the server by using their own names and mobile numbers; By comparing the server with the parents log-on information, the patents can log on the personal file number of this student, so as to know the classroom conditions and academic result trace of this student.

This system is free from the traditional teaching system and mode composed of fixed classroom, platform, teaching plan, textbook, blackboard and chalk, realizes modern internet-based interactive teaching mode and is out of the limit of space and time. Since electronic textbooks are stored in database, this system relieves the students from the burden of carrying heavy teaching materials and improves the teaching efficiency, interactivity and entertaining quality. The intelligent terminal of the present invention is portable and compact in design and easy to carry, thus can effectively solve such problems of the electric classroom teaching system in the prior art, such as bulky cabinet of desktop computer, big occupied room, many devices, complicated wiring, inconvenient operation and difficulty in troubleshooting. The present invention is provided with the design of HDMI interface in connection with projection equipment and touch screen, so that electromagnetic pen can directly compile information on the touch screen and substitute the writing through computer input keyboard and blackboard. With even convenient and rapid operation, this design can facilitate the teacher to improve teaching quality and efficiency. SIM card can be inserted through 3G PCI-E module, so 3G mobile network connection can be realized, and the present invention can be bound with the Smartphone terminals of parents through the mobile operator. By logging on the student's personal file number in server, the parents can view the student's result statistics and homework/class attendance conditions uploaded by the teacher from background to the server database, so as to know the learning conditions of child in school at anytime and anywhere.

Figure 13:
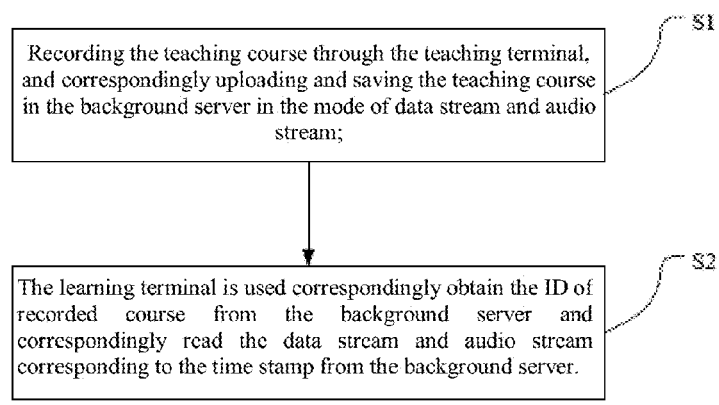
FIG. 13 is the implementation flow diagram of the teaching method in the present invention.

The network-based teaching system using the intelligent terminal of the present invention is described above. The network-based teaching method using the intelligent terminal will be further described in combination with attached FIG. 13, wherein the network-based teaching method of the present invention comprises the following steps:

Firstly establishing the communications connections among the teaching terminal, the learning terminal and the background server, wherein the communication connections comprise wired network connection as well as WIFI, 3G or 4G wireless network connection.

Recording the teacher course through the teaching terminal, and correspondingly uploading and saving the teacher course in the mode of data stream and audio stream in the back ground server; wherein when the teacher course is recorded through the teaching terminal, it is also necessary to record the ID corresponding to the course.

The learning terminal is used to correspondingly obtain the ID of recorded course from the background server and correspondingly read the data stream and audio stream corresponding to the time stamp from the background server.

The learning terminal feeding back information to the teaching terminal through the background server, and the teaching terminal correspondingly answering the questions in response to this feedback information, wherein the feedback information includes the electronic text document established by the learning terminal or the handwritten paper document scanned through the pick-up head of high shot instrument. Furthermore, the teaching terminal is designed to initiatively ask questions, request the designated learning terminal to answer such questions and give feedback upon completion of answering; or the teaching terminal is designed to initiatively ask questions, while the learning terminal makes the feedback response; Furthermore, after the teaching terminal has made selection, the selected learning terminal answers the questions, and the teaching terminal gives feedback upon completion of answering.

The intelligent terminal of the present invention can develop such applications as preparation before lesson, classroom teaching, after school program and remote education. Before class, the teacher can make lesson preparation through the intelligent terminal provided with Android operation system; by starting up the intelligent terminal, the teacher may establish Word, PPT documents, edit courseware or scan handwritten paper teaching plan through the pick-up head of high shot instrument; in the classroom teaching, the teacher uses the teaching terminal, the students use learning terminal, and network connection is established between the teaching terminal and the learning terminal through WIFI module or RJ45 network cable. Master-slave control is realized by using TCP/IP multicast protocol. All the sub-control terminals synchronously display the master control terminal interface, so as to realize multi-screen synchronous teaching; the classroom teaching steps can be synchronously switched into the learning terminals from cloud end, the learning terminals can be connected with Internet through the communication units to realize the network connection with the background server; it is feasible to subscribe course by logging on the remote education application unit through network and make validation through the teaching terminal at teacher end, so as to realize remote synchronous receiving of teacher's teaching terminal; through the pick-up head of high shot instrument, the video and audio signals collected by sound pickup and the content on touch screen, the teaching terminal synchronously transmits the content to the server database, so as to realize the synchronous learning at learning terminals or subsequent review learning; for the purpose of interactive communication, it is feasible to release multi-screen synchronization through teaching terminal, so that all the learning terminals are independent individuals, and network connection can still be realized among learning terminals; the students are divided into several discussion groups for interaction and free communication and discussion on classroom assignments; in the real-time question-and-answer drills, the students may raise hand through electronic key, and the teaching terminal will receive the list of seats of the students who would like to answer questions, the teacher selects the student to answer question; through the teaching terminal, the teacher can authorize all the other learning terminals to synchronously display the interface of this learning terminal; if the answer is incorrect, the teacher will return the list of seat of the students who would like to answer question and select another student to answer question; if the answer is correct, the system will proceed to the next question.

With respect to the learning terminals, the students can start the terminal and log on the server to download the assignment documents uploaded by the teacher to the server; directly input the content of answer by handwriting on the touch display screen, or firstly write the answers on the paper workbook and form document by scanning the paper workbook through the pick-up head of high shot instrument and then upload the document to server. The specific use mode is as follows: firstly, the teacher and the students use their respective terminals to make registration on background server through network by using their own personal identities; only when the matching between the registration information and the information stored in database has been completed, it is allowed to validate the completion of registration. Then, the students may log on the network and enter the interactive question answer application unit in the background server, directly write the questions through touch screen or use high shot instrument to scan the handwritten questions, then upload the completed question document to the background server; then, in the interactive question answer application unit, the students may view the list of teachers, click the list to view the detailed conditions of teachers, and select the teacher for solution; the teacher uses the teaching terminal to log on the interactive question answer unit module in the background server, view the list of questions to be answered, select the questions, use the touch screen and electromagnetic pen to write the answer, write text in the mode of scanning through high shot instrument, or use the high shot instrument to record the video/audio file of answers, and complete the uploading of answers; Finally, the students may view the list of the answered questions, download and view the details of questions and playback the answers.

To sum up, the present invention performs real-time recording of the multi-media lesson (subtopic explanation on multi-media whiteboard, intelligent result statistics of question answer, after-class audio discussion and speech) and classroom speech voice system; the students may request and review the recorded course through the remote test question coaching system or the classroom review function of the on-line instruction system.

The above-mentioned are merely preferred embodiments of the present invention but may not be used to limit the present invention. Any modification and equivalent substitution and improvement made within the spirit and principle of the present invention shall be included in the claims of the present invention.

What is claimed is:

1. An audio noise reduction circuit, comprising: an audio input circuit, comprising a first microphone, a second microphone and an input switching circuit, wherein the input switching circuit comprises a microphone change-over switch chip; the first microphone is connected with a first pin of the microphone change-over switch chip, the second microphone is connected with the first pin of the microphone change-over switch chip; both the first microphone and the second microphone are used to input the acquired audio signals including noise to the input switching circuit and output such audio signals from a common pin after switching processing through the microphone change-over switch chip; after being switched, the audio signals output from the common pin are output to a first output end after passing through a filter inductor L530;

an audio amplification buffer circuit, comprising a circuit designed to respectively perform amplification and buffer for the audio signals input by the first microphone and the second microphone, wherein the circuit designed to perform amplification and buffer for the audio signals input by the first microphone comprises capacitors C888, C889, C890, C891, C892 and C893 as well as an operation amplifier U544A and resistors R831, R832, R833, R834, R835 and R836; after the switched audio signals output from the common pin of the microphone change-over switch chip have passed through a filter inductor L530 and a blocking capacitor C888, the switched audio signals are output from the first output end to 3# pin of the operation amplifier U544A; after having been amplified and buffered by the operation amplifier U544A, these audio signals are output from 1# pin of the operation amplifier U544A; after passing through DC blocking capacitor C889, these audio signals reach the output end XMIC_0; the circuit designed to perform amplification and buffer for the audio signals input by the second microphone comprise capacitors C895, C896, C897, C898 and C899, an operation amplifier U544B and resistors R838, R839, R840, R841, R842 and R843; the input end MIC_1 is connected with the first pin of the microphone change-over switch chip through a test point TP24; after passing through the DC blocking capacitor C895, the input end MIC_1 is input to 5# pin of the operation amplifier U544B; after being amplified and buffered by the operation amplifier U544B, these audio signals are output by the 7# pin of the operation amplifier U544B; after passing through DC blocking capacitor C896, these signals are output to the output end XMIC_1;

an audio noise reduction processing chip, comprising a clock interface, an USB interface, an audio interface, a dual channel I2S DAC interface, a digital microphone interface and a dual channel I2S ADC interface, wherein the clock interface comprises a 12 MHz crystal input pin XTAL_I, a 12 MHz crystal output pin XTAL_O and a clock input pin D_CLK_IN; the USB interface comprises a USB_DM pin and a USB_DP pin; the audio interface comprises a common mode input signal reference pin XACREFL/XACREFR, a left channel microphone input pin XMICL, a right channel microphone input pin XMICR, a differential input pin D_MIC1_N of analog microphone 1, a differential input pin D_MIC0_N of analog microphone 0, a differential input pin D_MIC1_P of analog microphone 1 and a differential input pin D_MIC0_P of analog microphone 0; the dual channel I2S DAC interface comprises a I2S master clock pin DAC_MCLK, a I2S bit clock pin DAC_BCLK, a I2S serial data pin DAC_DOUT, a I2S left/right clock pin DAC_LRCK and a data input pin DAC_DIN; the dual channel I2S interface comprises a I2S bit clock D_I2S_BCLK, a I2S data input D_I2S_DI, a I2S left/right clock D_I2S_LRCK and a 2S serial data D_I2S_DO; the digital microphone interface comprises a digital microphone clock input pin D_DMO_CLK, a digital microphone clock out pin D_DMI_CLK, a digital microphone data input pin D_DMI_DAT, a digital microphone data output pin D_DMO_DAT; the dual channel I2S ADC interface comprises an analog-digital conversion data output pin ADC_DOUT, a I2S left/right clock pin ADC_LRCK, a I2S serial data input pin ADC_DIN, a I2S bit clock pin ADC_BCLK and a I2S master clock pin ADC_MCLK; wherein, after having been amplified and buffered by the audio amplification buffer circuit and having passed through the output end XMIC_0, the audio signals of the first microphone are input to the left channel microphone input pin XMICL; after having been amplified and buffered by the audio amplification and buffer circuit and having passed through the output end XMIC_1, the audio signals of the second microphone are input to the right channel microphone input pin XMICR; the audio noise reduction processing chip is used to abate the noise for the input two-way audio signals through the analog microphone and digital microphone interface array, perform blind source analysis through ICA algorithm to separate steady-state noise and non-steady state noise, perform voice extraction and separation, and output the extracted and separated voice signals through the left channel line output pin XLNOUTL and right channel line output pin XLNOUTR of the audio noise reduction processing chip;

a filter circuit, comprising input ends LOUT_L_OUT, LOUT_R_OUT, filter inductors L546 and L547, DC blocking capacitors C944 and C945; after noise reduction processing through the audio noise reduction processing chip, the extracted and separated voice signals pass through the left channel line output pin XLNOUTL and are output by the input end LOUT_L_OUT to the filter inductor L546 for filtering processing, then pass through the DC blocking capacitor C944 and then output by the LOUT_L end; after noise reduction processing by the audio noise reduction processing chip, the extracted and separated voice signals pass through the right channel line output pin XLNOUTR and are input by the input end LOUT_R_OUT to the filter inductor L547 for filtering processing, pass through the DC blocking capacitor C945 and then output by the LOUT_R end; and a power amplification circuit, comprising DC blocking capacitors C875 and C876, a power amplification chip U543 and filter inductors L531, L533, L535 and L536; after filtering through the filter circuit, the voice signals output by LOUT_L end pass through the DC blocking capacitor C875 and then are output to the power amplification chip U543; after having been amplified by the power amplification chip U543 as one group, the voice signals are respectively output to the speaker through the filter inductors L531 and L533.

2. The audio noise reduction circuit of claim 1, any way of the voice signals input by the first microphone and the second microphone is used as the detection signals of background noise, another way is used as the detection signal of voice, and the first microphone and the second microphone are located at different positions with distance of 5-20 CM.

3. The audio noise reduction circuit of claim 1, the audio noise reduction processing chip is a CM6571 chip; the microphone change-over switch chip is a SGM3157YC6 chip; both the operation amplifiers U544A and U544B are NJM2746V chip; the power amplification chip U543 is NS4251 chip.

4. The audio noise reduction circuit of claim 1, the audio input circuit is connected with CPU through USB interfaces USB_DM and USB_DP of the audio noise reduction processing chip CM6571.

5. An intelligent terminal, comprising:
   a host provided with the audio noise reduction circuit disclosed in claim 1; and
   a high shot instrument connected with the host.

6. The intelligent terminal of claim 5,
   the host comprises a bottom case and a central frame; a main board, a liquid crystal display and a touch panel are fixedly mounted between the bottom case and the central frame, the main board and the liquid crystal display are electrically connected through a FPC connector; an open slot is provided at the rear end of the base case; a holding slot is provided at the rear end of the central frame, the holding slot is correspondingly located in the open slot, a turnover cover board is also provided in the open slot; after being turned over, the turnover cover board and the holding slot can correspondingly form a sealed cavity;
   the high shot instrument is provided in the holding slot, wherein the high shot instrument comprises a main support, an auxiliary support and a photographing rod, wherein one end of the main support is rotatably connected with a connecting piece fixedly mounted in the holding slot through a rotating shaft piece, and another end of the main support is movably connected with one end of the auxiliary support through a first vertical rotating shaft, and the auxiliary support be opened or closed around the first vertical rotating shaft and in perpendicular to the main support; another end of the auxiliary support is movably connected with the photographing rod through a horizontal rotating shaft and a second vertical rotating shaft, the photographing rod be opened or closed around the second vertical rotating shaft and in perpendicular to the auxiliary support; when the photographing rod is under open state, it can be turned over around a horizontal rotating shaft in horizontal direction.

7. The intelligent terminal of claim 6, a battery, a 3G module, a SIM slot and a main board circuit including the audio noise reduction circuit are provided on the main board, wherein the 3G module and the SIM card are connected with the battery through the main board circuit.

8. The intelligent terminal of claim 7, the auxiliary support comprises an upper cover of auxiliary support, a lower cover of auxiliary support as well as a circuit board installed between the upper cover of auxiliary support and the lower cover of the auxiliary support, wherein the circuit board is electrically connected with the main board through the circuit provided in the main support.

9. The intelligent terminal of claim 8, the photographing rod comprises an upper cover of photographing rod, a lower cover of photographing rod as well as a pick-up module mounted between the upper cover of photographing rod and the lower cover of photographing rod, wherein the pick-up module is eclectically connected the circuit board, and a pick-up head is provided on the pick-up module.

10. The intelligent terminal of claim 9, an IC card slot used for inserting IC card and a magnetic card reading head used to read the information on magnetic card/strip are provided on the main board, wherein the both the IC card slot and the magnetic card reading head are connected with the main board circuit.

11. The intelligent terminal of claim 10, a jack is also provided at the rear end of the bottom case, and an electromagnetic pen is fixed in the jack.

12. The intelligent terminal of claim 11, a rear supporting pad is provided at the rear end bottom of the bottom case, and a front supporting pad is provided at the front end bottom.

13. A teaching system based on network, comprising:
   at least two intelligent terminals disclosed in claim 5, wherein one set is used as teaching terminal and the other set is used as learning terminal; and
   a background server, which is used to store the course information recorded and uploaded by the teaching terminal and to perform matching with this course information through ID and time stamp of recorded course;
   wherein the teaching terminal, the learning terminal and the background server are connected through network;
   the teaching terminal is used to record the teaching course and correspondingly upload and save the teaching course in the background server in the mode of data stream and audio stream; and
   the learning terminal is used to obtain the ID of recorded course and correspondingly read the data stream and audio stream corresponding to the time stamp from the background server.

14. The network-based teaching system of claim 13, the teaching terminal, the learning terminal and the background server are in communication connection through wireless or wired network.

15. The network-based teaching system of claim 13, the teaching system also comprises a projection equipment in communication connection with the teaching terminal.

16. The network-based teaching system of claim 13, the data stream includes the teaching time and action message recorded by the teaching terminal in the teacher's multi-media classroom; the audio stream includes the classroom time and voice message recorded by the teaching terminal in the teacher's multi-media classroom.

* * * * *